United States Patent
Yamamoto

(10) Patent No.: US 9,576,700 B2
(45) Date of Patent: Feb. 21, 2017

(54) BINDING TAPE MEMBER AND WIRE HARNESS

(71) Applicant: Sumitomo Wiring Systems, Ltd, Yokkaichi, Mie (JP)

(72) Inventor: Morichika Yamamoto, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/059,198

(22) Filed: Mar. 2, 2016

(65) Prior Publication Data

US 2016/0260522 A1 Sep. 8, 2016

(30) Foreign Application Priority Data

Mar. 3, 2015 (JP) .................................. 2015-041369

(51) Int. Cl.
| | |
|---|---|
| *H02G 3/04* | (2006.01) |
| *H01B 7/18* | (2006.01) |
| *B60R 16/02* | (2006.01) |
| *H01B 7/00* | (2006.01) |
| *H01B 7/04* | (2006.01) |
| *H01B 13/26* | (2006.01) |

(52) U.S. Cl.
CPC ......... *H01B 7/1855* (2013.01); *B60R 16/0215* (2013.01); *H01B 7/0045* (2013.01); *H01B 7/041* (2013.01); *H01B 13/26* (2013.01)

(58) Field of Classification Search
CPC ..... H01B 7/1855; H01B 7/0045; H01B 7/041; H01B 13/26; B60R 16/0215
USPC ........................................................ 174/72 A
See application file for complete search history.

(56) References Cited

U.S. PATENT DOCUMENTS

| | | | | |
|---|---|---|---|---|
| 6,392,147 | B1 * | 5/2002 | Hier .................. | F21S 8/033 174/481 |
| 2013/0273333 | A1 * | 10/2013 | Meier ................ | B60R 16/0215 428/189 |

FOREIGN PATENT DOCUMENTS

JP 2004-296336 A 10/2004

* cited by examiner

*Primary Examiner* — Sherman Ng
(74) *Attorney, Agent, or Firm* — Dinsmore & Shohl LLP

(57) ABSTRACT

A binding tape member and a wire harness having a binding tape member configured to having the same function of conventional wire harnesses without the need for corrugated tube, pre-wrapping or post wrapping. The binding tape member has a tape member body that covers a group of electrical lines by being wrapped around the group of electrical lines. The tape body has a trapezoidal upper surface portion with an upper side and a lower side that correspond to the tape width end edges and a trapezoidal lower surface portion facing a direction opposite to the trapezoidal upper surface portion are alternatingly arranged in the tape length direction. Also, in a trapezoidal upper surface portion and a trapezoidal lower surface portion that are adjacent to each other, sides thereof in the tape length direction are connected to each other in an integrated manner by a rectangular side wall portion.

6 Claims, 5 Drawing Sheets

Prior Art

BINDING TAPE MEMBER AND WIRE HARNESS

CROSS-REFERENCE TO RELATED APPLICATIONS

This application claims priority to Japanese Patent Application No. JP2015-041369 filed Mar. 3, 2015.

FIELD OF THE INVENTION

The present invention relates to a binding tape member and a wire harness for binding and protecting a group of electrical lines.

BACKGROUND OF THE INVENTION

Conventionally, in this type of wire harness, a group of electrical lines has been covered and protected by either a binding tape member or a slit corrugated tube, or both (e.g., see JP 2004-296336A).

FIGS. 5A to 5C are process diagrams showing a conventional general method of protecting a group of electrical lines, in which the protection method is substantially equivalent, with respect to the wire harness disclosed in FIG. 5 of JP 2004-296336A. First, as shown in FIG. 5A, in a wire harness 10, an adhesive tape member 11 is cylindrically wrapped 2 or 3 times in the circumferential direction around a group of electrical lines 12 at two locations a predetermined distance apart from each other as auxiliary wrapping, and then an adhesive tape member 13 is roughly wrapped between the cylindrical windings so as to form a prewrapping. Subsequently, a slit corrugated tube 14 is placed over the group of electrical lines 12 as shown in FIG. 5B. Next, as shown in FIG. 5C, an adhesive tape member 15 is wrapped around the slit corrugated tube 14, wherein generally half the width of the adhesive tape member 15 overlaps itself, so as to form a post wrapping. Alternatively, it should be appreciated in the step shown in FIG. 5A, the prewrapping may be replaced with the post wrapping, and in the step shown in FIG. 5C, the post wrapping may be replaced with rough wrapping.

As described above, conventionally, a method of protecting a group of electrical lines using the slit corrugated tube 14 has been applied particularly in the case where a burr or edge is included along the wiring path for the wire harness.

FIG. 5 in JP 2004-296336A shows an example of related art.

However, in the method of protecting a group of electrical lines using the conventional slit corrugated tube 14 shown in FIGS. 5B and 5C, the slit corrugated tube 14 is placed over the group of electrical lines with the slit facing downward such that intruding water is drained to the outside through the slit in the corrugated tube 14, and therefore it has not been possible to avoid pre-wrapping the group of electrical lines 12 with the adhesive tape member 11 to prevent one or more of the lines in the group of electrical lines 12 from passing through the slit and hanging outside.

Also, in the method of protecting a group of electrical lines using the conventional wire harness 10, it is not possible to avoid performing post-wrapping by roughly wrapping or half-overlap wrapping the adhesive tape member 15 around the outer surface of the corrugated tube 14 to prevent the slit in the corrugated tube 14 from spreading, thus requiring the operation of pre-wrapping the group of electrical lines 12, the operation of attaching the corrugated tube 14, and the operation of post-wrapping the outer surface of the corrugated tube 14, which is time-consuming and costly.

Also, in the method of protecting a group of electrical lines using the conventional wire harness 10, it is necessary to prepare various sizes of corrugated tubes to match the diameter of the group of electrical lines in accordance with various trunk lines and branch lines of wire harnesses and various wire harnesses, and it is necessary to prepare in advance corrugated tubes that have been cut to various lengths in accordance with the length of the group of electrical lines that needs to be protected by the adhesive tape member.

Furthermore, in the method of protecting a group of electrical lines using the conventional wire harness 10, in the case of half-overlap wrapping that adhesive tape member 15 around the corrugated tube 14, intruding water is less likely to be drained to the outside, and in the case where the wire harness is supported to a vehicle panel in the vicinity of the engine or the like, vibration is transmitted from the vehicle panel to the corrugated tube and the group of electrical lines, and abnormal noise is generated due to interference between them. In particular, there has been the problem of high-volume abnormal noise being generated due to the corrugated tube being thick-walled and hard.

The present invention was achieved in order to solve issues such as those described above, and an object thereof is to provide a wire harness and a binding tape member that, by merely performing tape wrapping, have a protection function equivalent to a protection function for a group of electrical lines obtained by the conventional combination of a slit corrugated tube and pre-wrapping and post-wrapping with a binding tape member, that do not require a corrugated tube or pre-wrapping and post-wrapping material and operations for attachment thereof, that enable water intruding into the wire harness to be favorably drained, and that can reduce the generation of abnormal noise.

SUMMARY OF THE INVENTION

In order to achieve the above object, a binding tape member according to the present invention is a binding tape member having a tape member body that has flexibility and is made of a synthetic resin, and forming a binding tape-type protection portion that covers a group of electrical lines by being overlap wrapped around the group of electrical lines, wherein a trapezoidal upper surface portion with an upper side and a lower side that correspond to tape width end edges and a trapezoidal lower surface portion facing a direction opposite to the trapezoidal upper surface portion are alternatingly arranged in a tape length direction, and in a trapezoidal upper surface portion and a trapezoidal lower surface portion that are adjacent to each other, sides thereof in the tape length direction are connected to each other in an integrated manner by a rectangular side wall portion.

According to this configuration, with the binding tape member according to the present invention, by adjusting the tensile force in the wrapping direction in overlap wrapping, the dimensions of the openings of the inward recessed portions of the trapezoidal upper surface portions are easily changed, thus making it possible to overlap wrap the binding tape member around the group of electrical lines such that the trapezoidal upper surface portions and the trapezoidal lower surface portions respectively overlap the trapezoidal upper surface portions and the trapezoidal lower surface portions in the previous winding in a shifted manner.

For this reason, it is possible to configure a wire harness that includes a binding tape-type protection portion in which, when overlap wrapped around the group of electrical lines, the trapezoidal lower surface portions are wrapped around the group of electrical lines in multiple spiral shapes and adhered thereto, and the inward recessed portions formed by the trapezoidal upper surface portions and the rectangular side wall portions on the two sides thereof are overlap wrapped so as to successively cover each other and form multiple spiral-shaped tunnels around the group of electrical lines.

With the wire harness according to the present invention, it is possible to, by merely performing tape wrapping, have a protection function equivalent to a protection function for a group of electrical lines obtained by the conventional combination of a slit corrugated tube and pre-wrapping and post-wrapping with a binding tape member, there is no need for a corrugated tube or pre-wrapping and post-wrapping material and operations for attachment thereof, it is possible for water intruding into the wire harness to be favorably drained, and it is possible to reduce the generation of abnormal noise.

In the wire harness according to the present invention, it is preferable that an adhesive layer is formed on the tape member body. In the case where the adhesive layer is not formed on the tape member body, the wrapping beginning end and the wrapping completion end in the tape wrapping are fixed using separate adhesive tape, but in the case where the adhesive layer is formed on the tape member body, the wrapping beginning end and the wrapping completion end in the tape wrapping do not need to be fixed using separate adhesive tape.

In order to achieve the above object, a wire harness according to the present invention is a wire harness including: a group of electrical lines; and a binding tape-type protection portion that covers the group of electrical lines, wherein the binding tape-type protection portion is formed by overlap wrapping the above-described binding tape member around the group of electrical lines, and the overlap wrapping of the binding tape member around the group of electrical lines is performed such that a trapezoidal upper surface portion is layered on a half of a trapezoidal upper surface portion in a previous winding, and a trapezoidal lower surface portion is layered on a half of a trapezoidal lower surface portion in a previous winding.

According to this configuration, with the wire harness according to the present invention, the binding tape-type protection portion formed by overlap wrapping the binding tape member around the group of electrical lines has a protection function equivalent to the protection function for a group of electrical lines obtained by the conventional combination of a slit corrugated tube and pre-wrapping and post-wrapped with a binding tape member.

Therefore, with the wire harness according to the present invention, there is no need for a corrugated tube or pre-wrapping and post-wrapping material and operations for attachment thereof, it is possible for water intruding into the wire harness to be favorably drained, and it is possible to reduce the generation of abnormal noise.

According to the present invention, it is possible to provide a wire harness and a binding tape member that, by merely performing tape wrapping, have a protection function equivalent to a protection function for a group of electrical lines obtained by the conventional combination of a slit corrugated tube and pre-wrapping and post-wrapping with a binding tape member, that do not require a corrugated tube or pre-wrapping and post-wrapping material and operations for attachment thereof, that enable water intruding into the wire harness to be favorably drained, and that can reduce the generation of abnormal noise.

DETAILED DESCRIPTION OF THE PREFERRED EMBODIMENTS

An embodiment of the present invention will be described below with reference to the drawings.

Figure 1:
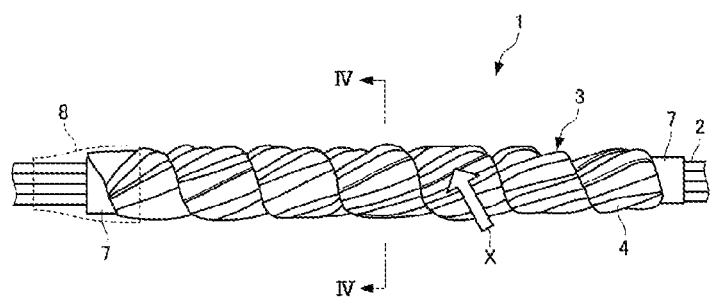
FIG. 1 is a schematic front view of a wire harness according to an embodiment of the present invention.

First, the configuration of a wire harness 1 will be described. As shown in FIG. 1, the wire harness 1 includes a group of electrical lines 2 and a binding tape-type protection portion 3 that covers the group of electrical lines 2. The wire harness 1 of the present embodiment is suitable as a wire harness that is routed outside a vehicle compartment.

Figure 4:
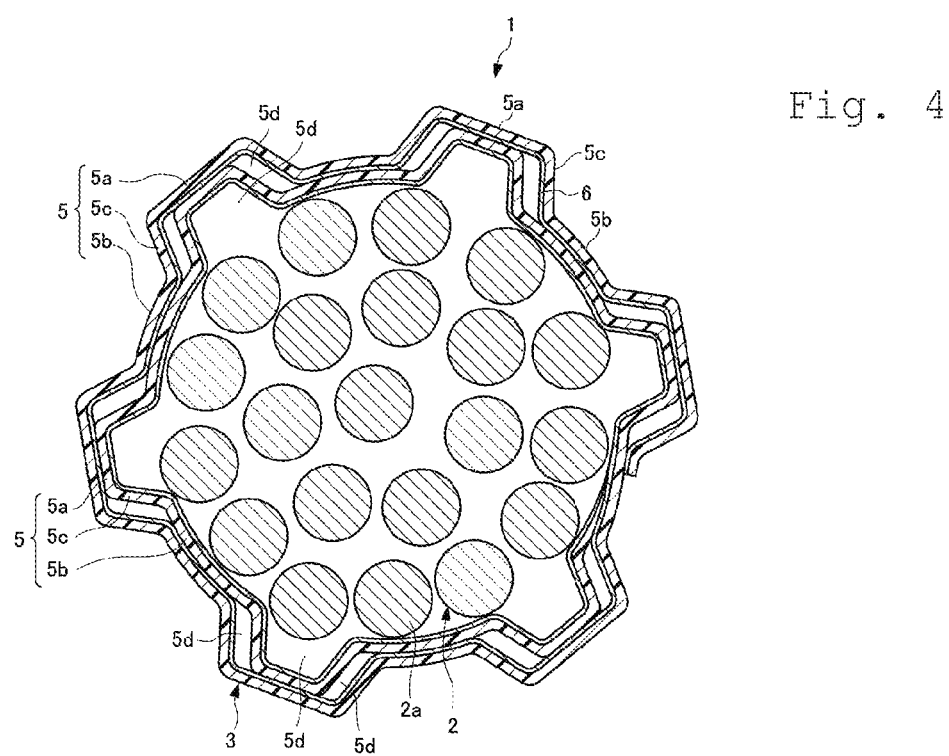
FIG. 4 is a cross-sectional view of FIG. 1 taken along IV-IV.
Figure 5A:
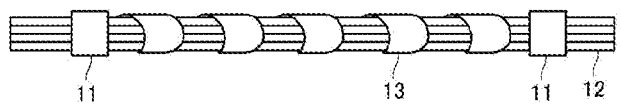
FIG. 5A is a front view showing a first step of a conventional method of protecting a group of electrical lines of a wire harness.
Figure 5B:
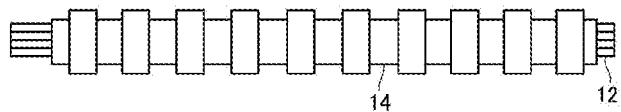
FIG. 5B is a front view of the group of electrical lines shown in FIG. 5A, showing a second step.
Figure 5C:
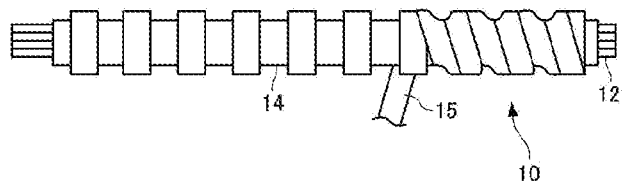
FIG. 5C is a front view of the group of electrical lines shown in FIGS. 5A and 5B showing a third step.

As shown in FIG. 4, the group of electrical lines 2 is a bundle of sheathed electrical lines 2a in this example, but it may be a bundle that includes multiple covered electrical lines and one bare electrical line. Furthermore, the group of electrical lines 2 may be a shielded electrical line.

Figure 2A:
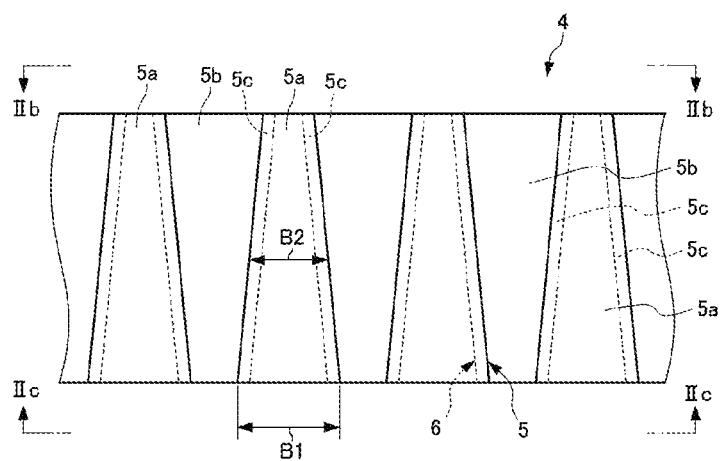
FIG. 2A is a front view of the binding tape member.
Figure 2B:
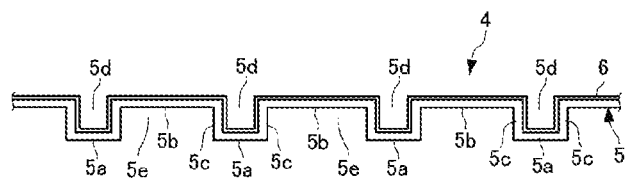
FIG. 2B is a cross-sectional view of FIG. 2A taken along lines IIb-IIb.
Figure 2C:
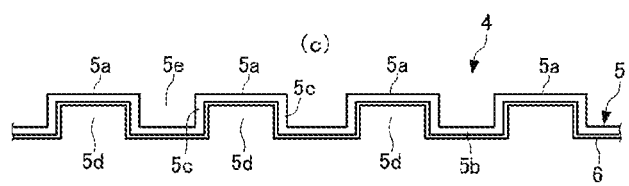
FIG. 2C is a cross-sectional view of FIG. 2A taken along lines IIc-IIc.

FIGS. 2A to 2C are diagrams showing a binding tape member 4 that forms the binding tape-type protection portion 3 (shown in FIG. 1). The binding tape member 4 has a tape member body 5 that is made of synthetic resin, and an adhesive layer 6 that is formed on one surface of the tape member body 5. The binding tape-type protection portion 3 that covers the group of electrical lines 2 is formed by half-overlap wrapping the binding tape member 4 around the group of electrical lines 2. Half-overlap wrapping is overlap wrapping in which the overlapping width is half of the tape width.

As shown in FIGS. 2A to 2C, the tape member body 5 includes a trapezoidal upper surface portion 5a whose upper side and lower side correspond to the tape-width end edges in a view from a direction perpendicular to the tape surface, and a trapezoidal lower surface portion 5b facing a direction opposite to the trapezoidal upper surface portion 5a. The trapezoidal upper surface portion 5a and the trapezoidal lower surface portion 5b are alternatingly arranged in the tape length direction. Regarding a trapezoidal upper surface portion 5a and a trapezoidal lower surface portion 5b that are adjacent to each other, sides thereof in the tape length direction are connected to each other in an integrated manner by a rectangular side wall portion 5c.

As shown in FIGS. 2B and 2C, the tape member body 5 has mountain-forming spaces 5d, each of which is formed by a trapezoidal upper surface portion 5a and the rectangular side wall portions 5c on the two sides thereof, and also has valley-forming spaces 5e, each of which is formed by a trapezoidal lower surface portion 5b and the rectangular side wall portions 5c on the two sides thereof.

Figure 3:
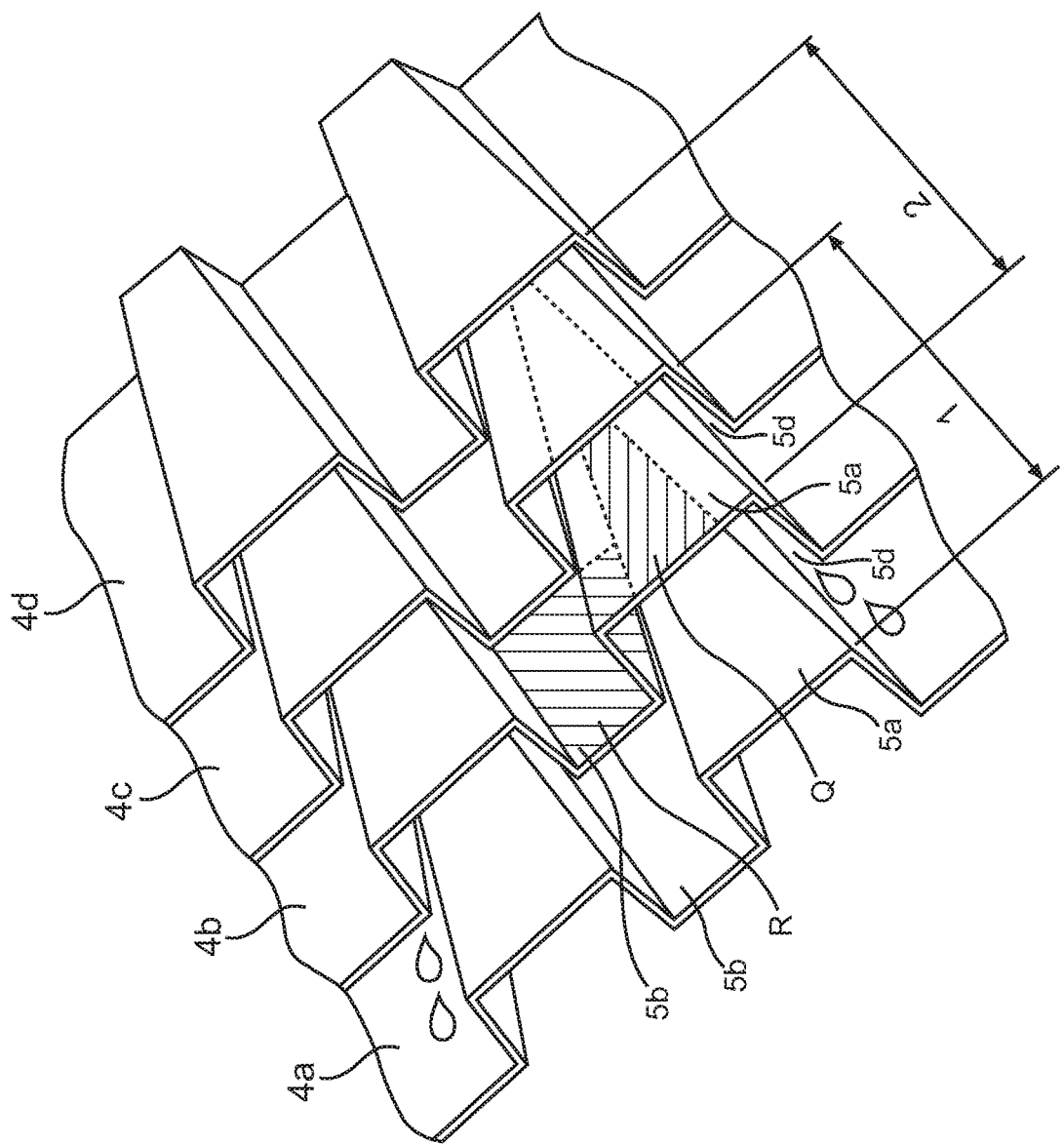
FIG. 3 is a schematic enlarged perspective view of a portion of the binding tape-type protection portion of the wire harness according to the embodiment of the present invention.

As shown in FIG. 2A, the mountain-forming spaces 5d and the valley-forming spaces 5e are shaped as spaces facing mutually opposite directions. When the binding tape members 4a to 4d in the first to fourth windings are layered in a shifted manner with a pitch of half of the tape width as shown in FIG. 3, the trapezoidal upper surface portion 5a and the trapezoidal lower surface portion 5b of the binding tape member 4b in the second winding are layered onto the trapezoidal upper surface portion 5a and the trapezoidal lower surface portion 5b of the binding tape member 4a in the first winding and adhered thereto by the adhesive layer 6 in hatched areas Q and R, and the binding tape members 4c and 4d are successively layered thereon in a shifted manner with a pitch of half of the tape width. Accordingly, an overall integrated member is obtained, and the mountain-forming spaces 5d and the valley-forming spaces 5e respectively become extended.

Accordingly, by adjusting the wrapping force when half-overlap wrapping the binding tape member 4 around the group of electrical lines 2, the binding tape member 4 undergoes deformation such that the pitch of the mountain-forming spaces 5d and the pitch of the valley-forming spaces 5e easily increase, thus making it possible for the trapezoidal upper surface portions 5a to be successively layered onto each other, for the valley-forming spaces 5e to be successively layered onto each other.

As shown in FIG. 3, the portions of the mountain-forming spaces 5d of the tape member body 5 layered on the lower side remain open, and the portions layered on the upper side span the mountain-forming spaces 5d on the lower side, thus forming finely divided spaces on the two sides sandwiching the mountain-forming spaces 5d on the lower side. In this way, as the binding tape member 4 is layered on itself in a shifted manner with a pitch of half of the tape width, the inner surface side and the outer surface side are put into communication via the mountain-forming spaces 5d.

Letting 1 pitch be the dimension in the tape length direction obtained by combining a trapezoidal upper surface portion 5a and a trapezoidal lower surface portion 5b that are adjacent to each other, it is sufficient that the pitch and the tape width relative to the circumference of the group of electrical lines 2 is determined such that 4 to 6 pitches exist in one winding when the group of electrical lines 2 is half-overlap wrapped.

It is desirable that the trapezoidal upper surface portion 5a and the trapezoidal lower surface portion 5b are shaped as isosceles trapezoids in order to have the ability to be formed by press molding. It is desirable that the trapezoidal upper surface portion 5a and the trapezoidal lower surface portion 5b have the same size, but the dimension of the trapezoidal lower surface portion 5b in the tape length direction may be changed as desired by changing the pitch interval of the trapezoidal upper surface portions 5a.

The tape member body 5 is molded using a resin selected from among polypropylene, nylon, polyethylene, polyimide, amide-imide, ester imide, epoxy, and urethane.

The tape member body 5 has a thickness of 0.2 to 0.5 mm, a width of 19 to 40 mm, and a length of 0.4 to 1 m, for example, but these dimensions are determined as necessary in consideration of user-convenience, speed, covering length, and the like.

The adhesive layer 6 is formed over the entire width of one surface (the inner surface side) of the tape member body 5 of the binding tape member 4. There are no particular limitations on the type of adhesive. The adhesive layer 6 may be constituted by affixing double-sided adhesive tape to the tape member body 5. Release paper is affixed to the adhesive layer 6 before being wrapped around the group of electrical lines 2. In the case of the configuration in which release paper is affixed to the adhesive layer 6 before being wrapped around the group of electrical lines 2, the release paper is peeled off while the tape member body 5 is wrapped around the group of electrical lines 2.

The binding tape member 4 is molded by using a male mold and a female mold to press mold a three-layered band-shaped member made up of a band plate-shaped synthetic resin plate that will become the tape member body 5, an adhesive layer formed on one surface of the synthetic resin plate, and release paper that hides the upper surface of the adhesive layer, then heating the wall surfaces of the molds, and then stabilizing the shape by performing cooling.

Also, the wire harness 1 has auxiliary wrapping portions 7 and a wrapping completion end fixing portion 8. Before the binding tape member 4 is wrapped around the group of electrical lines 2, the auxiliary wrapping portion 7 is provided at two locations, namely the wrapping beginning end and the wrapping completion end of the binding tape member 4 with respect to the group of electrical lines 2, and is formed by cylindrically wrapping adhesive tape multiple times. The wrapping completion end fixing portion 8 is obtained by wrapping adhesive tape around the wrapping completion end of the binding tape member 4 after the completion of the wrapping of the binding tape member 4 around the group of electrical lines 2, that is to say, is obtained by cylindrically wrapping separate adhesive tape around the wrapping completion end of the binding tape member 4 multiple times, then moving the wrapping position in the direction of the group of electrical lines 2 and cylindrically wrapping the adhesive tape around the group of electrical lines 2 multiple times.

Next, a method for manufacturing the wire harness 1 having the above configuration will be briefly described.

As shown in FIGS. 1, 3, and 4, the group of electrical lines 2 and the binding tape member 4 are prepared, and two auxiliary wrapping portions 7 are formed on the group of electrical lines 2. Then, as shown in FIG. 1, the binding tape member 4 is layered on one of the auxiliary wrapping portions 7, and the binding tape-type protection portion 3 that covers the group of electrical lines 2 is formed by half-overlap wrapping (spiral wrapping) the binding tape member 4 in the direction of an arrow X. The wrapping completion end fixing portion 8 is then provided by using separate adhesive tape to fix the wrapping completion end of the binding tape-type protection portion 3 to the group of electrical lines 2 as shown in FIG. 1. Manufacturing the wire harness 1 is thus completed.

When the binding tape member 4 is half-overlap wrapped around the group of electrical lines 2, by adjusting the tensile force (wrapping force) exerted in the tape lengthwise direction, it is possible to widen the opening width of the mountain-forming spaces 5d and the opening width of the valley-forming spaces 5e so as to extend in the tape lengthwise direction, thus making it easy for subsequently wrapped mountain-forming spaces 5d and valley-forming spaces 5e to be layered on previously wrapped mountain-forming spaces 5d and valley-forming spaces 5e.

In the half-overlap wrapped portion of the binding tape member 4, the mountain-forming spaces 5d and the valley-forming spaces 5e in the tape half layered on the bottom side serve as guides, the two peaks in the tape half layered on the top side are wrapped thereon, and the adhesive layer 6 located in the tape half layered on the top side is adhered so as to be layered on the two peaks in the tape half layered on the bottom side. The half-overlap wrapping (spiral wrapping) is performed smoothly in this way.

Note that in the half-overlap wrapping operation, the binding tape member 4 is normally wrapped rightward around the group of electrical lines 2, but it may be wrapped leftward or rightward.

Next, actions and effects of the wire harness 1 having the above configuration will be described.

In the wire harness 1 according to the above embodiment, by adjusting the tensile force in the wrapping direction of the binding tape member 4 in half-overlap wrapping, the dimensions of the openings of the mountain-forming spaces 5d and the openings of the valley-forming spaces 5e are easily changed, thus making it easy to realize half-overlap wrapping around the group of electrical lines 2. The mountain-forming spaces 5d and the mountain-forming spaces 5d serve as wrapping guides in half-overlap wrapping, thus making it possible to efficiently perform the half-overlap wrapping operation.

In the wire harness 1 according to the above embodiment, the binding tape member 4 having the openings of the mountain-forming spaces 5d and the valley-forming spaces 5e is half-overlap wrapped around the group of electrical lines 2, and therefore the mountain-forming spaces 5d become multiple spiral protrusions on the group of electrical lines 2 and have a spiral-shaped tunnel inside the spiral protrusions. If the thickness of the tape member body 5 is selected appropriately, the strength of the rectangular side wall portions 5c can be ensured without impairing the ability to be wrapped, and the tape member body 5 has high cushioning ability with respect to external pressure.

In the wire harness 1 according to the above embodiment, letting 1 pitch be the dimension in the tape length direction obtained by combining a trapezoidal upper surface portion 5a and a trapezoidal lower surface portion 5b that are adjacent to each other, the pitch and the tape width relative to the circumference of the group of electrical lines 2 are determined such that 4 to 6 pitches exist in one winding when the group of electrical lines 2 is half-overlap wrapped. Accordingly, the gaps in the circumferential direction between the spiral-shaped tunnels included in the binding tape-type protection portion 3 are close, and the cushioning ability in the circumferential direction becomes uniform.

Also, in the wire harness 1 according to the embodiment, the binding tape-type protection portion 3 formed by half-overlap wrapping the binding tape member 4 around the group of electrical lines 2 separates the outer surface of the wire harness (the outer surface of the binding tape-type protection portion 3) from the group of electrical lines 2 protected therein by the height of the mountain-forming spaces 5d, and the double layering of the binding tape member 4 and the cushioning ability with respect to external pressure in the planar direction work in cooperation so as to exhibit an effective protection function in the case where a burr or an edge is included along the wiring path for the wire harness. Accordingly, the wire harness 1 according to the above embodiment has a protection function equivalent to the protection function obtained by the conventional combination of half-overlap wrapping and a corrugated tube, can be used in place of the conventional combination of half-overlap wrapping and a corrugated tube, requires only the wrapping of the binding tape member 4, and does not require a corrugated tube or pre-wrapping and post-wrapping material and operations for attachment thereof as in conventional technology.

In the wire harness 1 according to the above embodiment, the trapezoidal upper surface portions 5a that are supported by rectangular side wall portions 5c on the two sides are overlapped in two layers, thus protecting the group of electrical lines 2 at positions separated from the group of electrical lines 2. Accordingly, the binding tape member 4 has a protection function equivalent to the large-diameter cylindrical portions of a conventional slit corrugated tube protecting the group of electrical lines 2 at positions separated from the group of electrical lines 2, and exhibits an effective protection function in the case where a burr or an edge is included along the wiring path for the wire harness 1.

In a conventional wire harness, it is necessary to prepare a corrugated tube cut to a certain length in advance, and also prepare corrugated tubes of various sizes in accordance with the diameter of various groups of electrical lines. However, the wire harness 1 of the above embodiment requires only preparing the binding tape member 4 and wrapping it around the group of electrical lines 2, and is applicable to various groups of electrical lines regardless of their diameters and the length of the group of electrical lines 2 that is to be protected.

If the wire harness 1 according to the above embodiment is routed along a curve, it is possible to avoid detachment of the adhesive layer 6 interposed between the layered surfaces of the trapezoidal upper surface portions 5a and the layered surfaces of the trapezoidal lower surface portions 5b, and exposure of the group of electrical lines 2 does not occur. In other words, when the wire harness 1 bends, it is possible to avoid detachment of the adhesive layer 6 contributing to half-overlap wrapping by changing the sizes of the openings of the mountain-forming spaces 5d and the openings of the valley-forming spaces 5e.

In the wire harness 1 according to the above embodiment, the binding tape-type protection portion 3 is formed by half-overlap wrapping the binding tape member 4, and is a porous spiral wrapped member in which the mountain-forming spaces 5d put the interior and the outside into communication with each other, thus making it possible for water intruding into the wire harness 1 to be favorably drained.

In the wire harness 1 according to the above embodiment, the binding tape-type protection portion 3 is formed by half-overlap wrapping the binding tape member 4 that is softer than a corrugated tube, and therefore in the case of interference between the group of electrical lines 2 and the binding tape-type protection portion 3 that receive vibration from a vibration generation source, the generated abnormal noise is suppressed to a much lower level than in the case of interference between a corrugated tube and the group of electrical lines. Moreover, the generated abnormal noise propagates widely through the complexly-shaped spiral tunnels, and the sound energy is consumed as vibration in the wall surfaces forming the spiral tunnels, thus making it possible to significantly suppress the generation of noise inside the wire harness 1.

The present invention may have the following configurations instead of the above embodiment.

Although the above embodiment describes an example of forming the adhesive layer 6 over the entire width of one surface of the tape member body 5, the technical scope of the present invention also encompasses the case where the adhesive layer 6 is formed on at least the overlaid surface of the half of the tape member body 5 that is layered on the top side in half-overlap wrapping. Furthermore, the technical scope of the present invention also encompasses the case where the adhesive layer 6 is not provided. In these cases, the binding tape-type protection portion 3 and the group of electrical lines 2 are not adhered by the adhesive layer 6, and therefore the binding tape-type protection portion 3 and the group of electrical lines 2 are fixed by using separate adhesive tape to fix the winding beginning end and winding completion end of the tape winding to the group of electrical lines 2.

Although the above embodiment describes a method of molding the binding tape member 4 by performing press molding, heating, and cooling, a configuration is possible in which the tape member body 5 is molded using a die, the adhesive layer 6 is formed by being applied to the one surface of the tape member body 5, and continuous release paper is affixed so as to be affixed to only the trapezoidal lower surface portions 5b.

Although the rectangular side wall portions 5c are provided perpendicular to the trapezoidal upper surface portions 5a and the trapezoidal lower surface portions 5b, they may be provided as inclined walls.

As described above, the present invention has effects such as that it is possible to, by merely performing tape wrapping, have a protection function equivalent to a protection function for a group of electrical lines obtained by the conventional combination of a slit corrugated tube and pre-wrapping and post-wrapping with a binding tape member, there is no need for a corrugated tube or pre-wrapping and post-wrapping material and operations for attachment thereof, it is possible for water intruding into the wire harness to be favorably drained, and it is possible to reduce the generation of abnormal noise. The present invention is useful to general wire harnesses that protect a group of electrical lines using a conventional slit corrugated tube.

The invention claimed is:

1. A binding tape member for covering a group of electrical lines, the binding tape member comprising:
   a tape member body forming a binding tape-type protection portion that covers the group of electrical lines by being overlap wrapped around the group of electrical lines,
   the tape member including a trapezoidal upper surface portion with an upper side and a lower side that correspond to tape width end edges and a trapezoidal lower surface portion facing a direction opposite to the trapezoidal upper surface portion are alternatingly arranged in a tape length direction, and
   in the trapezoidal upper surface portion and the trapezoidal lower surface portion that are adjacent to each other, sides thereof in the tape length direction are connected to each other in an integrated manner by a rectangular side wall portion.

2. The binding tape member according to claim 1, wherein an adhesive layer is formed on the tape member body.

3. A wire harness comprising:
   a group of electrical lines; and
   a binding tape-type protection portion that covers the group of electrical lines,
   wherein the binding tape-type protection portion is formed by overlap wrapping a binding tape member around the group of electrical lines, and
   the overlap wrapping of the binding tape member around the group of electrical lines is performed such that a trapezoidal upper surface portion is layered on a half of a trapezoidal upper surface portion in a previous winding, and a trapezoidal lower surface portion is layered on a half of a trapezoidal lower surface portion in a previous winding.

4. The wire harness as set forth in claim 3, wherein the binding tape member includes a trapezoidal upper surface portion with an upper side and a lower side that correspond to tape width end edges and a trapezoidal lower surface portion facing a direction opposite to the trapezoidal upper surface portion are alternatingly arranged in a tape length direction, and wherein in the trapezoidal upper surface portion and the trapezoidal lower surface portion that are adjacent to each other, sides thereof in the tape length direction are connected to each other in an integrated manner by a rectangular side wall portion.

5. The wire harness as set forth in claim 4, wherein an adhesive layer is formed on the tape member body.

6. A method of manufacturing a wire harness having a group of electrical lines, the method including the steps of:
   providing a binding tape member, the binding tape member having a trapezoidal upper surface portion and a trapezoidal lower surface portion;
   wrapping the binding tape member around the group of electrical lines, wherein a half width of the binding tape member overlaps itself such that the trapezoidal upper surface portion is layered on a half of the trapezoidal upper surface portion in a previous winding, and the trapezoidal lower surface portion is layered on a half of the trapezoidal lower surface portion in a previous winding.

* * * * *